United States Patent
Mohiuddin et al.

(10) Patent No.: US 9,117,355 B2
(45) Date of Patent: *Aug. 25, 2015

(54) WIRELESS SIGNAL ACTUATED SECURITY TAG

(71) Applicants: Mohammad Mohiuddin, Boyton Beach, FL (US); Stewart E. Hall, Wellington, FL (US)

(72) Inventors: Mohammad Mohiuddin, Boyton Beach, FL (US); Stewart E. Hall, Wellington, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/782,613

(22) Filed: Mar. 1, 2013

(65) Prior Publication Data

US 2014/0091933 A1   Apr. 3, 2014

Related U.S. Application Data

(60) Provisional application No. 61/707,378, filed on Sep. 28, 2012.

(51) Int. Cl.
| | |
|---|---|
| G08B 13/14 | (2006.01) |
| G08B 13/24 | (2006.01) |
| E05B 73/00 | (2006.01) |
| G06Q 20/32 | (2012.01) |

(52) U.S. Cl.
CPC .......... *G08B 13/246* (2013.01); *E05B 73/0047* (2013.01); *G06Q 20/32* (2013.01); *G08B 13/242* (2013.01); *G08B 13/2434* (2013.01)

(58) Field of Classification Search
CPC ............. G08B 13/242; G08B 13/2434; G08B 13/2425; G06K 19/0727; E05B 73/0047
USPC .................................. 340/572.1, 572.3, 572.7
See application file for complete search history.

(56) References Cited

U.S. PATENT DOCUMENTS

| | | | |
|---|---|---|---|
| 5,942,978 A | * | 8/1999 | Shafer .......................... 340/572.1 |
| 7,701,346 B2 | * | 4/2010 | Lindsay et al. ............. 340/572.3 |
| 2007/0296545 A1 | | 12/2007 | Clare |

(Continued)

FOREIGN PATENT DOCUMENTS

| | | |
|---|---|---|
| CN | 201741233 U | 2/2011 |
| WO | 0180193 A1 | 10/2001 |

OTHER PUBLICATIONS

Machine translation of specification, abstract and claims of CN 201741233.

*Primary Examiner* — John A Tweel, Jr.
(74) *Attorney, Agent, or Firm* — Robert J. Sacco, Esq.; Carol E. Thorstad-Forsyth, Esq.; Fox Rothschild LLP

(57) ABSTRACT

Systems and methods for operating a security tag of an Electronic Article Surveillance ("EAS") system. The methods involve providing a unique identifier from the security tag to an application installed on a mobile communication device via a first short-range communication when the security tag is attached to an article for sale. A second short-range communication is received by the security tag from the mobile communication device that comprises a detachment command. The detachment command is received by the security tag exclusively after the article has been successfully purchased. Thereafter, the security tag verifies that the second short-range communication is intended to be processed thereby. Next, the security tag performs operations to actuate a detachment mechanism in response to the detachment command so that the security tag can be detached from the article for sale.

20 Claims, 10 Drawing Sheets

(56) References Cited

U.S. PATENT DOCUMENTS

2010/0156642 A1* 6/2010 Lindsay et al. ............ 340/572.7
2012/0235818 A1 9/2012 Forster
2014/0091932 A1* 4/2014 Mohiuddin et al. ....... 340/572.1

* cited by examiner

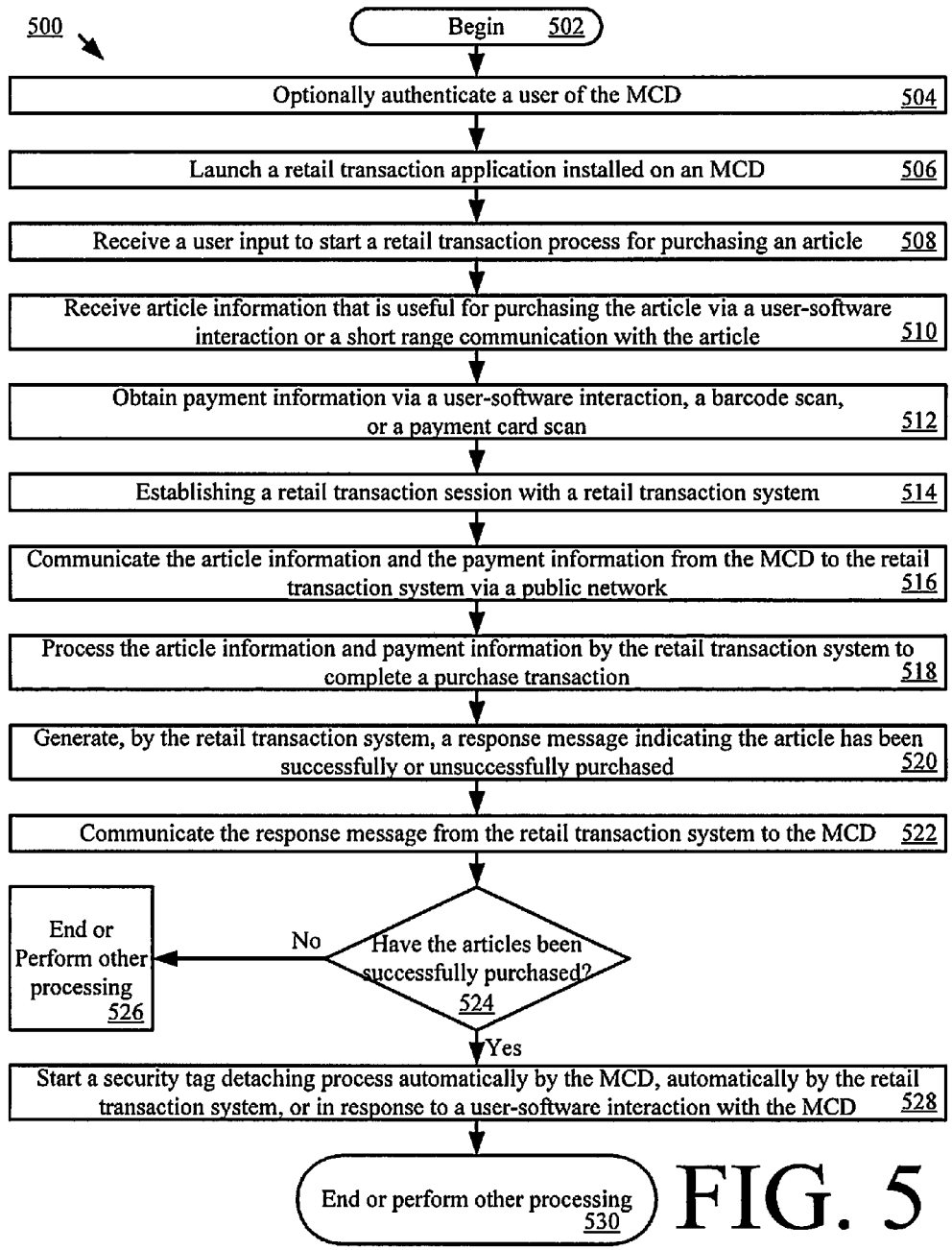

WIRELESS SIGNAL ACTUATED SECURITY TAG

CROSS REFERENCE TO RELATED APPLICATIONS

This application claims the benefit of U.S. Provisional Patent Application Ser. No. 61/707,378 filed Sep. 28, 2012, which is herein incorporated by reference.

FIELD OF THE INVENTION

This document relates generally to security tags for Electronic Article Surveillance ("EAS"). More particularly, this document relates to systems and methods for detaching security tags from articles using wireless communication technology.

BACKGROUND OF THE INVENTION

A typical EAS system in a retail setting may comprise a monitoring system and at least one security tag or label attached to an article to be protected from unauthorized removal. The monitoring system establishes a surveillance zone in which the presence of security tags and/or labels can be detected. The surveillance zone is usually established at an access point for the controlled area (e.g., adjacent to a retail store entrance and/or exit). If an article enters the surveillance zone with an active security tag and/or label, then an alarm may be triggered to indicate possible unauthorized removal thereof from the controlled area. In contrast, if an article is authorized for removal from the controlled area, then the security tag and/or label thereof can be deactivated and/or detached therefrom. Consequently, the article can be carried through the surveillance zone without being detected by the monitoring system and/or without triggering the alarm.

The process of detaching a security tag/label from an article requires an external physical detachment device. In a retail setting, these types of detachment devices are only used by authorized store personnel. There are currently no security tags available in the market which can be detached from articles using only wireless communication. There is also no process available in the retail industry which allows a customer to purchase an item and then also detach a security tag without using a traditional fixed Point Of Sale ("POS") station (e.g., a retail checkout counter).

SUMMARY OF THE INVENTION

The present invention concerns implementing systems and methods for operating a security tag of an EAS system. The methods involve providing a unique identifier from the security tag to an application installed on a Mobile Communication Device ("MCD") via a first short-range communication when the security tag is attached to an article for sale. The MCD can include, but is not limited to, a mobile phone (e.g., a Smartphone). The first short-range communication can include, but is not limited to, a barcode communication or a near field communication.

A second short-range communication is received by the security tag from the MCD that comprises a detachment command. The detachment command is sent exclusively after the article has been successfully purchased. In some scenarios, the detachment command includes, but is not limited to, a one-time-only detachment key and/or instructions for programming the security tag to actuate the detachment mechanism using the one-time-only detachment key. The second short-range communication may be decrypted by the security tag if it was transmitted in an encrypted form. Any type of cryptography can be employed here without limitation.

Subsequently, the security tag verifies that it is intended to be processed thereby. Next, the security tag performs operations to actuate a detachment mechanism in response to the detachment command so that the security tag can be detached from the article for sale. An audio indication and/or a visual indication can be provided by the security tag indicating that the detachment mechanism has been actuated.

The security tag can be placed in a collection bin once it has been detached from the article. Thereafter, the security tag can be attached to another article. The attachment can be achieved by: locking an electronic lock of the security tag in response to the reception of a locking code from the MCD; and/or automatically securing the security tag to the article when a pre-defined time period expires. The pre-defined time period may be specified by time limit information received by the security tag from the MCD. A message may be sent from the security tag to the MCD via a third short-range communication indicating that the electronic lock has been once again locked.

DESCRIPTION OF THE DRAWINGS

Embodiments will be described with reference to the following drawing figures, in which like numerals represent like items throughout the figures, and in which:

FIG. 5 is a flow diagram of an exemplary purchase transaction process facilitated by a mobile communication device (e.g., a Smartphone).

DETAILED DESCRIPTION OF THE INVENTION

Figure 1:
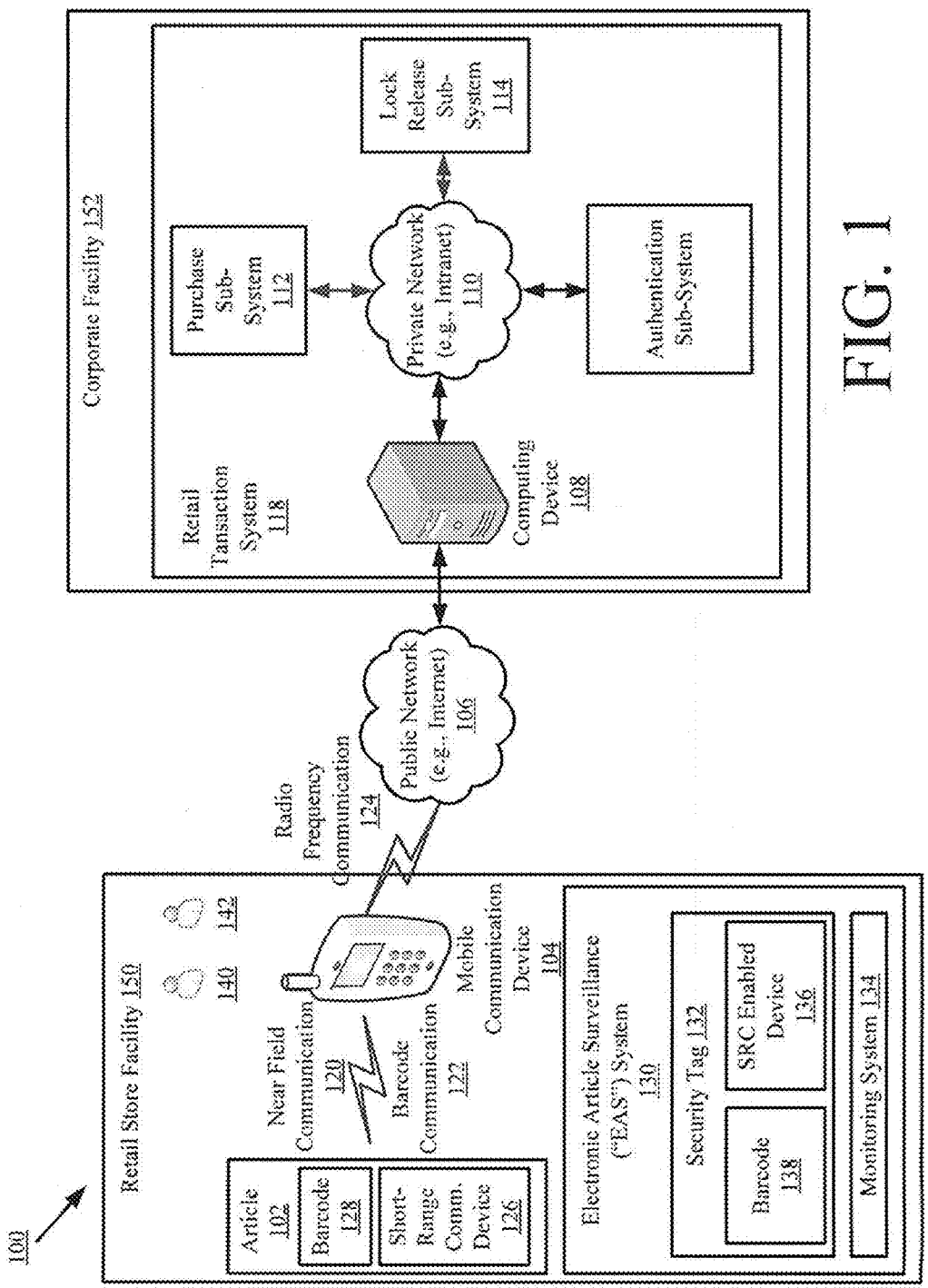
FIG. 1 is a schematic illustration of an exemplary system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Embodiments will now be described with respect to FIGS. 1-6E. Embodiments generally relate to systems and methods for completing a retail transaction for an article and detaching a security tag attached to the article using wireless communication technology (e.g., Short-Range Communication ("SRC") technology and/or mobile communication technology). The entire retail transaction takes place away from a fixed POS station (e.g., a retail checkout counter). As such, wireless communication between a mobile communication device (e.g., a Smartphone) and an article may be employed for obtaining product and/or purchase information for the article. Wireless communication is also employed between the mobile communication device and the security tag for detaching the security tag from the article after the purchase has been completed. Such wireless communication can be achieved using barcode technology, Near Field Communication ("NFC") technology and/or any other short-range communication technology, as discussed below in relation to FIGS. 1-6E.

Referring now to FIG. 1, there is provided a schematic illustration of an exemplary system 100 that is useful for understanding the present invention. The system 100 is generally configured to allow a customer to purchase an article 102 using wireless communication technology. The wireless communication technology can include, but is not limited to, SRC technology and/or mobile communication technology. The SRC technology includes, but is not limited to, barcode technology, NFC technology, InfRared ("IR") technology, Wireless Fidelity ("Wi-Fi") technology, Radio Frequency Identification ("RFID") technology, Bluetooth technology, and/or ZigBee technology. The mobile communication technology can include, but is not limited to, Radio Frequency ("RF") communication technology.

As shown in FIG. 1, system 100 comprises a retail store facility 150 including an EAS 130. The EAS 130 comprises a monitoring system 134 and at least one security tag 132. Although not shown in FIG. 1, the security tag 132 is attached to article 102, thereby protecting the article 102 from an unauthorized removal from the retail store facility 150. The monitoring system 134 establishes a surveillance zone (not shown) within which the presence of the security tag 132 can be detected. The surveillance zone is established at an access point (not shown) for the retail store facility 150. If the security tag 132 is carried into the surveillance zone, then an alarm is triggered to indicate a possible unauthorized removal of the article 102 from the retail store facility 150.

During store hours, a customer 140 may desire to purchase the article 102. The customer 140 can purchase the article 102 without using a traditional fixed POS station (e.g., a checkout counter). Instead, the purchase transaction can be achieved using an MCD 104. MCD 104 (e.g., a Smartphone) can be in the possession of the customer 140 or a store associate 142 at the time of a purchase transaction. An exemplary architecture of the MCD 104 will be described below in relation to FIG. 3. Still, it should be understood that the MCD 104 has a retail transaction application installed thereon that is configured to facilitate the purchase of article 102 and the detachment of security tag 132 from article 102. The retail transaction application can be a pre-installed application, an add-on application or a plug-in application.

In order to initiate a purchase transaction, the retail transaction application is launched via a user-software interaction. The retail transaction application facilitates the exchange of data between the article 102, security tag 132, customer 140, store associate 142, and/or Retail Transaction System ("RTS") 118. For example, after the retail transaction application is launched, a user 140, 142 is prompted to start a retail transaction process for purchasing the article 102. The retail transaction process can be started simply by performing a user software interaction, such as by depressing a key on a keypad of the MCD 104 or touching a button on a touch screen display of the MCD 104.

Subsequently, the user 140, 142 may manually input into the retail transaction application article information. Alternatively or additionally, the user 140, 142 places the MCD 104 in proximity of article 102. As a result of this placement, the MCD 104 obtains article information from the article 102. The article information includes any information that is useful for purchasing the article 102, such as an article identifier and an article purchase price. In some scenarios, the article information may even include an identifier of the security tag 132 attached thereto. The article information can be communicated from the article 102 to the MCD 104 via an SRC, such as a barcode communication 122 or an NFC 120.

In the barcode scenario, article 102 has a barcode 128 attached to an exposed surface thereof. The term "barcode", as used herein, refers to a pattern or symbol that contains embedded data. Barcodes may include, for example, one-dimensional barcodes, two dimensional barcodes (such as matrix codes, Quick Response ("QR") codes, Aztec codes and the like), or three-dimensional bar codes. The embedded data can include, but is not limited to, a unique identifier of the article 102 and/or a purchase price of article 102. The barcode 128 is read by a barcode scanner/reader (not shown in FIG. 1) of the MCD 104. Barcode scanners/readers are well known in the art. Any known or to be known barcode scanner/reader can be used herein without limitation.

In the NFC scenarios, article 102 may comprise an SRC enabled device 126. The SRC enabled device 126 can be separate from security tag 132 or comprise security tag 132. An SRC communication 120 occurs between the SRC enabled device 126 and the MCD 104 over a relatively small distance (e.g., N centimeters or N inches, where N is an integer such as twelve). The SRC communication 120 may be established by touching components 126, 104 together or bringing them in close proximity such that an inductive coupling occurs between inductive circuits thereof. In some scenarios, the NFC operates at 13.56 MHz and at rates ranging from 106 kbit/s to 848 kbit/s. The NFC may be achieved using NFC transceivers configured to enable contactless communication at 13.56 MHz. NFC transceivers are well known in the art, and therefore will not be described in detail herein. Any known or to be known NFC transceivers can be used herein without limitation.

After the MCD 104 obtains the article information, payment information is input into the retail transaction application by the user 140, 142. The payment information can include, but is not limited to, a customer loyalty code, payment card information, and/or payment account information. The payment information can be input manually, via an electronic card reader (e.g., a magnetic strip card reader), or via a barcode reader. Electronic card readers and barcode readers are well known in the art, and therefore will not be described herein. Any known or to be known electronic card reader and/or barcode reader can be used herein without limitation. The payment information can alternatively or additionally be obtained from a remote data store based on a customer identifier or account identifier. In this case, the payment information can be retrieved from stored data associated with a previous sale of an article to the customer 140.

Upon obtaining the payment information, the MCD 104 automatically performs operations for establishing a retail transaction session with the RTS 118. The retail transaction session can involve: communicating the article information and payment information from MCD 104 to the RTS 118 via an RF communication 124 and public network 106 (e.g., the Internet); completing a purchase transaction by the RTS 118; and communicating a response message from the RTS 118 to MCD 104 indicating that the article 102 has been successfully or unsuccessfully purchased. The purchase transaction can involve using an authorized payment system, such as a bank Automatic Clearing House ("ACH") payment system, a credit/debit card authorization system, or a third party system (e.g., PayPal®, SolidTrust Pay® or Google Wallet®).

Notably, the communications between MCD 104 and computing device 108 may be secure communications in which cryptography is employed. In such scenarios, a cryptographic key can also be communicated from MCD 104 to RTS 118, or vice versa. The cryptographic key can be a single use cryptographic key. Any type of cryptography can be employed herein without limitation.

The purchase transaction can be completed by the RTS 118 using the article information and payment information. In this regard, such information may be received by a computing device 108 of the RTS 118 and forwarded thereby to a sub-system of a private network 110 (e.g., an Intranet). For example, the article information and purchase information can also be forwarded to and processed by a purchase sub-system 112 to complete a purchase transaction. When the purchase transaction is completed, a message is generated and sent to the MCD 104 indicating whether the article 102 has been successfully or unsuccessfully purchased.

If the article 102 has been successfully purchased, then a security tag detaching process can be started automatically by the RTS 118 or by the MCD 104. Alternatively, the user 140, 142 can start the security tag detaching process be performing a user-software interaction using the MCD 104. In all three scenarios, the article information can be forwarded to and processed by a lock release sub-system 114 to retrieve a detachment key or a detachment code that is useful for detaching the security tag 132 from the article 102. The detachment key or code is then sent from the RTS 118 to the MCD 104 such that the MCD 104 can cause the security tag 132 to actuate a detaching mechanism (not shown in FIG. 1). In this regard, the MCD 104 generates a detach command and sends a wireless detach signal including the detach command to the security tag 132. The security tag 132 authenticates the detach command and activates the detaching mechanism. Once the security tag 132 has been detached from article 102, the customer 140 can carry the article 102 through the surveillance zone without setting off the alarm.

Alternatively or additionally in all three security tag detaching scenarios, the MCD 104 may prompt the user 140, 142 to obtain a unique identifier (not shown in FIG. 1) for the security tag 132. The unique identifier can be obtained manually from user 140, 142 or via a wireless communication, such as a barcode communication or an SRC.

In the barcode scenario, security tag 132 has a barcode 138 attached to an exposed surface thereof. The barcode comprises a pattern or symbol that contains embedded data. The embedded data can include, but is not limited to, a unique identifier of the security tag 132 and/or a unique identifier of the article 102 being secured thereby. The barcode 138 is read by a barcode scanner/reader (not shown in FIG. 1) of the MCD 104.

In the NFC scenario, security tag 132 may comprise an SRC enabled device 136. An SRC communication (not shown in FIG. 1) occurs between the SRC enabled device 136 and the MCD 104 over a relatively small distance (e.g., N centimeters or N inches, where N is an integer such as twelve). The SRC may be established by touching components 136, 104 together or bringing them in close proximity such that an inductive coupling occurs between inductive circuits thereof. The SRC may be achieved using NFC transceivers configured to enable contactless communication at 13.56 MHz.

Once the unique identifier for the security tag 132 has been obtained, MCD 104 communicates the same to the RTS 118 via network 106 (e.g., the Internet or a mobile phone network) and RF communication 124. At the RTS 118, the unique identifier is processed for various reasons. In this regard, the unique identifier may be received by computing device 108 and forwarded thereby to the lock release sub-system 114 to retrieve the detachment key or code that is useful for detaching the security tag 132 from article 102. The detachment key or code is then sent from the RTS 118 to the MCD 104 such that the MCD 104 can cause the security tag 132 to actuate a detaching mechanism (not shown in FIG. 1) in the same manner as described above.

In view of the forgoing, lock release sub-system 114 can comprise a data store in which detachment keys and/or detachment codes are stored in association with unique identifiers for a plurality of articles and/or security tags, respectively. Each detachment key can include, but is not limited to, at least one symbol selected for actuating a detaching mechanism of a respective security tag. In some scenarios, the detachment key can be a one-time-only use detachment key in which it enables the detachment of a security tag only once during a given period of time (e.g., N days, N weeks, N months, or N years, where N is an integer equal to or greater than 1). Each detachment code can include, but is not limited to, at least one symbol from which a detachment key can be derived or generated. The detachment key can be derived or generated by the MCD 104 or the RTS 118. The detachment key and/or code can be stored in a secure manner within the MCD 104 or the RTS 118, as will be discussed below. In the case that the key is generated by the MCD 104, the key generation operations are performed in a secure manner. For example, the algorithm for generating the key can be performed by a processor with a tamper-proof enclosure, such that if a person maliciously attempts to extract the algorithm from the processor the algorithm will be erased prior to any unauthorized access thereto.

Although FIG. 1 is shown as having two facilities (namely the retail store facility 150 and the corporate facility 152), the present invention is not limited in this regard. For example, the facilities 150, 152 can reside in the same or different building or geographic area. Alternatively or additionally, the facilities 150, 152 can be the same or different sub-parts of larger facility.

Figure 2:
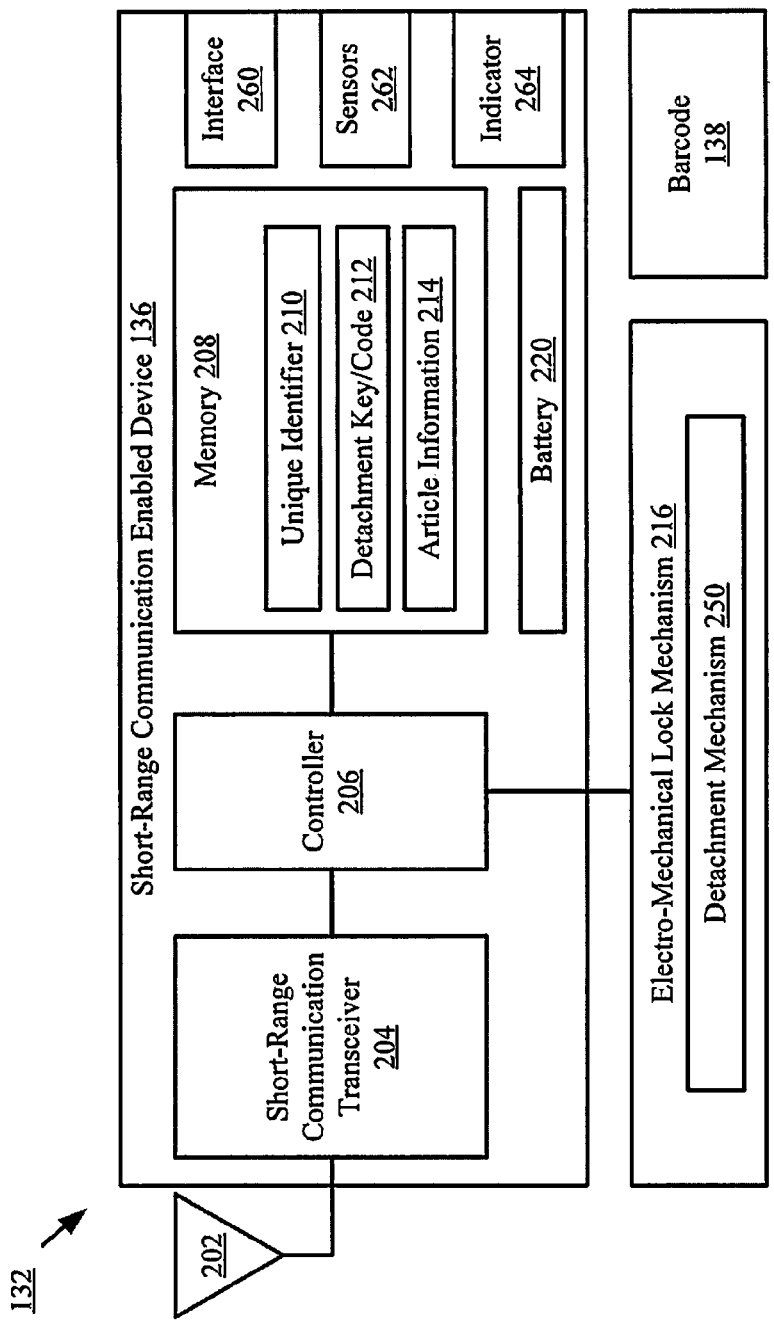
FIG. 2 is a schematic illustration of an exemplary security tag that is useful for understanding the present invention.

Referring now to FIG. 2, there is provided a schematic illustration of an exemplary architecture for security tag 132. Security tag 132 can include more or less components than that shown in FIG. 2. However, the components shown are sufficient to disclose an illustrative embodiment implementing the present invention. Some or all of the components of the security tag 132 can be implemented in hardware, software and/or a combination of hardware and software. The hardware includes, but is not limited to, one or more electronic circuits.

The hardware architecture of FIG. 2 represents an embodiment of a representative security tag 132 configured to facilitate the prevention of an unauthorized removal of an article (e.g., article 102 of FIG. 1) from a retail store facility (e.g., retail store facility 150 of FIG. 1). In this regard, the security tag 132 may have a barcode 138 affixed thereto for allowing data to be exchanged with an external device (e.g., MCD 104 of FIG. 1) via barcode technology.

The security tag 132 also comprises an antenna 202 and an SRC enabled device 136 for allowing data to be exchanged with the external device via SRC technology. The antenna 202 is configured to receive SRC signals from the external device and transmit SRC signals generated by the SRC enabled device 136. The SRC enabled device 136 comprises an SRC transceiver 204. SRC transceivers are well known in the art, and therefore will not be described herein. However, it should be understood that the SRC transceiver 204 processes received SRC signals to extract information therein. This information can include, but is not limited to, a request for certain information (e.g., a unique identifier 210), and/or a message including information specifying a detachment key or code for detaching the security tag 132 from an article. The SRC transceiver 204 may pass the extracted information to the controller 206. At the controller 206, the information may be pre-processed for decrypting the same if it was received in an encrypted form. The information may also be pre-processed to determine whether the SRC signal is to be handled by the security tag 132, i.e., to verify that the SRC signal is directed or targeted to the security tag 132. Such a determination can be made by comparing an identifier contained in the SRC signal to the unique identifier 210 stored in memory 208. If the identifiers match each other, then it is determined that the SRC signal is intended to be handled by the security tag 132. The information may further be pre-processed to identify the type of information contained in the SRC signal, i.e., whether or not the SRC signal includes a request for certain information.

If the extracted information includes a request for certain information, then the controller 206 may perform operations to retrieve a unique identifier 210 and/or article information 214 from memory 208. The article information 214 can include a unique identifier of an article and/or a purchase price of the article. The retrieved information is then sent from the security tag 132 to a requesting external device (e.g., MCD 104 of FIG. 1) via an SRC communication.

In contrast, if the extracted information includes information specifying a one-time-only use key and/or instructions for programming the security tag 132 to actuate a detachment mechanism 250 of an electro-mechanical lock mechanism 216, then the controller 206 may perform operations to simply actuate the detachment mechanism 250 using the one-time-only key. The detachment mechanism 250 is configured to unlock a lock and/or to release a tack, pin or lanyard that keeps the security tag 132 attached to an article. The tack, pin or lanyard can be manually removed or mechanically removed by the detachment mechanism 250. In this regard, the detachment mechanism 250 includes, but is not limited to, a solenoid, a linear motor/actuator, a motor, a conductive coil/magnet combination, and/or an alloy that changes shape when exposed to an electromagnetic or magnetic field. Once the detachment mechanism 250 has been actuated, an auditory indication (e.g., a buzzer) and/or visual indication (e.g., emitted light from a Light Emitting Diode ("LED")) of such actuation can be provided by indicator 264.

Alternatively or additionally, the controller 206 can: parse the information from a received message; retrieve a detachment key/code 212 from memory 208; and compare the parsed information to the detachment key/code to determine if a match exists therebetween. If a match exists, then the controller 206 generates and sends a command to the electro-mechanical lock mechanism 216 for actuating the detachment mechanism 250. An auditory or visual indication can be output by indicator 264 of the security tag 132 when the detachment mechanism 250 is actuated. If a match does not exist, then the controller 206 may generate a response message indicating that the detachment key/code specified in the extracted information does not match the detachment key/code 212 stored in memory 208. The response message may then be sent from the security tag 132 to a requesting external device (e.g., MCD 104 of FIG. 1) via a wireless short-range communication or a wired communication via interface 260. A message may also be communicated to another external device or network node via interface 260.

In some scenarios, the connections between components 204, 206, 208, 216, 260 are unsecure connections or secure connections. The phrase "unsecure connection", as used herein, refers to a connection in which cryptography and/or tamper-proof measures are not employed. The phrase "secure connection", as used herein, refers to a connection in which cryptography and/or tamper-proof measures are employed. Such tamper-proof measures include enclosing the physical electrical link between two components in a tamper-proof enclosure.

Notably, the memory 208 may be a volatile memory and/or a non-volatile memory. For example, the memory 208 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 208 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

The electro-mechanical lock mechanism 216 is operable to actuate the detachment mechanism 250. The detachment mechanism 250 is generally configured to: (a) release a lock, a tack, pin or a lanyard that keeps the security tag 132 attached to an article; and/or (b) move a lock between a lock state and an unlock state. The electro-mechanical lock mechanism 216 is shown as being indirectly coupled to SRC transceiver 204 via controller 206. The invention is not limited in this regard. The electro-mechanical lock mechanism 216 can additionally or alternatively be directly coupled to the SRC transceiver 204. One or more of the components 204, 206 can cause the tack, pin, lanyard or lock of the detachment mechanism 250 to be transitioned between states in accordance with information received from an external device (e.g., MCD 104 of FIG. 1).

Notably, the electro-mechanical lock mechanism 216 can include a mono-stable locking mechanism, or a bi-stable locking mechanism. In mono-stable locking mechanisms, an inserted pin is held by the tag using spring tension, whereas the pin can only be inserted into the tag but cannot be removed without the help of a detacher. Once removed, the pin can be inserted and secured without any special device. In a bi-stable locking mechanism, once the pin is removed from the tag using a detacher, the locking mechanism stays in an open position. The pin can be attached to the tag by: being pushed into the tag such that a locking mechanism automatically snaps onto the pin; or being manually secured in place via a locking mechanism once the pin is inserted into the pin.

The components 204-208, 260 and a battery 220 may be collectively referred to herein as the SRC enabled device 136. The SRC enabled device 136 can be incorporated into a device which also houses the electro-mechanical lock mechanism 216, or can be a separate device which is in direct or indirect communication with the electro-mechanical lock mechanism 216. The SRC enabled device 136 is coupled to a power source. The power source may include, but is not limited to, battery 220 or an A/C power connection (not shown). The status of the power source can be continuously or periodically monitored by controller 206. Alternatively or additionally, the SRC enabled device 136 is configured as a passive device which derives power from an RF signal inductively coupled thereto.

The SRC enabled device 136 may also include one or more sensors 262. The sensors 262 can include, but are not limited to, an accelerometer, a gyroscope, and/or a thermometer. The sensors 262 may also comprise various sensors for tracking the geographic location of the security tag 132. Such a tracking system can be useful for purposes of tracking an article that has been removed from a retail store facility without authorization.

Figure 3:
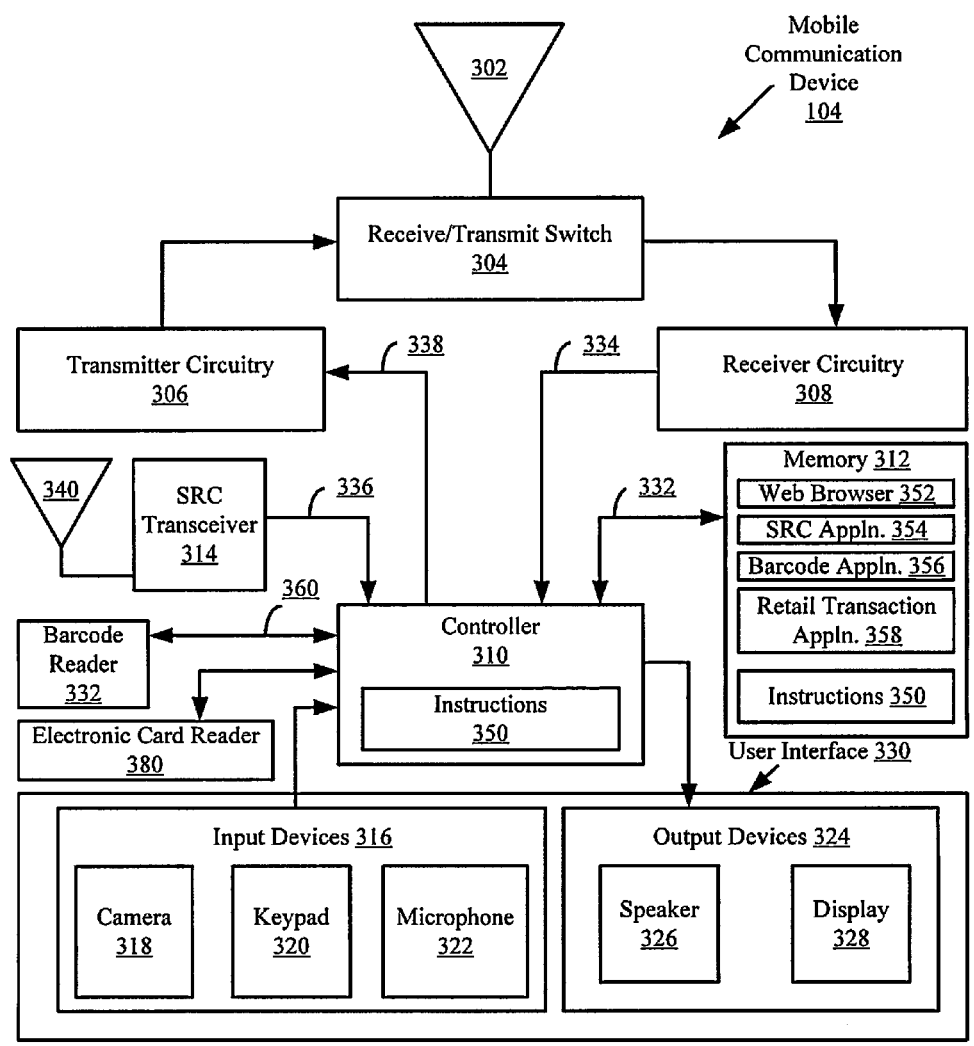
FIG. 3 is a schematic illustration of an exemplary mobile communication device that is useful for understanding the present invention.

Referring now to FIG. 3, there is provided a more detailed block diagram of an exemplary architecture for the MCD 104 of FIG. 1. In some scenarios, computing device 108 of FIG. 1 is the same as or similar to MCD 104. As such, the following discussion of MCD 104 is sufficient for understanding computing device 108 of FIG. 1.

MCD 104 can include, but is not limited to, a notebook computer, a personal digital assistant, a cellular phone, or a mobile phone with smart device functionality (e.g., a Smartphone). MCD 104 may include more or less components than those shown in FIG. 3. However, the components shown are sufficient to disclose an illustrative embodiment implementing the present invention. Some or all of the components of the MCD 104 can be implemented in hardware, software and/or a combination of hardware and software. The hardware includes, but is not limited to, one or more electronic circuits.

The hardware architecture of FIG. 3 represents one embodiment of a representative MCD 104 configured to facilitate the data exchange (a) between an article (e.g., article 102 of FIG. 1) and an RTS (e.g., an RTS 118 of FIG. 1) via SRC technology and/or mobile technology and (b) between a security tag (e.g., security tag 132 of FIG. 1) and the RTS via SRC technology and/or mobile technology. In this regard, MCD 104 comprises an antenna 302 for receiving and transmitting RF signals. A receive/transmit ("Rx/Tx") switch 304 selectively couples the antenna 302 to the transmitter circuitry 306 and receiver circuitry 308 in a manner familiar to those skilled in the art. The receiver circuitry 308 demodulates and decodes the RF signals received from a network (e.g., the network 106 of FIG. 1). The receiver circuitry 308 is coupled to a controller (or microprocessor) 310 via an electrical connection 334. The receiver circuitry 308 provides the decoded signal information to the controller 310. The controller 310 uses the decoded RF signal information in accordance with the function(s) of the MCD 104.

The controller 310 also provides information to the transmitter circuitry 306 for encoding and modulating information into RF signals. Accordingly, the controller 310 is coupled to the transmitter circuitry 306 via an electrical connection 338. The transmitter circuitry 306 communicates the RF signals to the antenna 302 for transmission to an external device (e.g., a node of a network 106 of FIG. 1) via the Rx/Tx switch 304.

An antenna 340 may be coupled to an SRC transceiver 314 for receiving SRC signals. The SRC transceiver 314 may include, but is not limited to, an NFC transceiver. NFC transceivers are well known in the art, and therefore will not be described in detail herein. However, it should be understood that the SRC transceiver 314 processes the SRC signals to extract information therefrom. The SRC transceiver 314 may process the SRC signals in a manner defined by the SRC application 354 installed on the MCD 104. The SRC application 354 can include, but is not limited to, a Commercial Off The Shelf ("COTS") application. The SRC transceiver 314 provides the extracted information to the controller 310. As such, the SRC transceiver 314 is coupled to the controller 310 via an electrical connection 336. The controller 310 uses the extracted information in accordance with the function(s) of the MCD 104. For example, the extracted information can be used by the MCD 104 to generate a request for a detachment key or code associated with a particular security tag (e.g., security tag 132 of FIG. 1) from an RTS (e.g., an RTS 118 of FIG. 1). Thereafter, the MCD 104 sends the request to the RTS via transmit circuitry 306 and antenna 302.

The controller 310 may store received and extracted information in memory 312 of the MCD 104. Accordingly, the memory 312 is connected to and accessible by the controller 310 through electrical connection 332. The memory 312 may be a volatile memory and/or a non-volatile memory. For example, the memory 312 can include, but is not limited, a RAM, a DRAM, an SRAM, a ROM and a flash memory. The memory 312 may also comprise unsecure memory and/or secure memory. The memory 312 can be used to store various other types of information therein, such as authentication information, cryptographic information, location information and various service-related information.

The MCD 104 also may comprise a barcode reader 332. Barcode readers are well known in the art, and therefore will not be described herein. However, it should be understood that the barcode reader 332 is generally configured to scan a barcode and process the scanned barcode to extract information therefrom. The barcode reader 332 may process the barcode in a manner defined by the barcode application 356 installed on the MCD 104. Additionally, the barcode scanning application can use the MCD camera to capture the barcode image for processing. The barcode application 356 can include, but is not limited to, a COTS application. The barcode reader 332 provides the extracted information to the controller 310. As such, the barcode reader 332 is coupled to the controller 310 via an electrical connection 360. The controller 310 uses the extracted information in accordance with the function(s) of the MCD 104. MCD 104 may be used as a pass-through for information between a security tag (e.g., security tag 132 of FIG. 1) and an RTS (e.g., RTS 118 of FIG. 1).

As shown in FIG. 3, one or more sets of instructions 350 are stored in memory 312. The instructions 350 may include customizable instructions and non-customizable instructions. The instructions 350 can also reside, completely or at least partially, within the controller 310 during execution thereof by MCD 104. In this regard, the memory 312 and the controller 310 can constitute machine-readable media. The term "machine-readable media", as used here, refers to a single medium or multiple media that stores one or more sets of instructions 350. The term "machine-readable media", as used here, also refers to any medium that is capable of storing, encoding or carrying the set of instructions 350 for execution by the MCD 104 and that causes the MCD 104 to perform one or more of the methodologies of the present disclosure.

The controller 310 is also connected to a user interface 330. The user interface 330 comprises input devices 316, output devices 324 and software routines (not shown in FIG. 3) configured to allow a user to interact with and control software applications (e.g., application software 352-356 and other software applications) installed on the MCD 104. Such input and output devices may include, but are not limited to, a display 328, a speaker 326, a keypad 320, a directional pad (not shown in FIG. 3), a directional knob (not shown in FIG. 3), a microphone 322 and a camera 318. The display 328 may be designed to accept touch screen inputs. As such, user interface 330 can facilitate a user-software interaction for launching applications (e.g., application software 352-356) installed on MCD 104. The user interface 330 can facilitate a user-software interactive session for writing data to and reading data from memory 312.

The display 328, keypad 320, directional pad (not shown in FIG. 3) and directional knob (not shown in FIG. 3) can collectively provide a user with a means to initiate one or more software applications or functions of the MCD 104. The application software 354-358 can facilitate the data exchange (a) between an article (e.g., article 102 of FIG. 1) and an RTS (e.g., an RTS 118 of FIG. 1) and (b) between a security tag (e.g., security tag 132 of FIG. 1) and the RTS. In this regard, the application software 354-358 performs one or more of the following: verify an identity of a user of the MCD 104 via an authentication process; present information to the user indicating that her/his identity has been or has not been verified; present a Graphical User Interface ("GUI") to the user for enabling the user to initiate a retail transaction process for purchasing one or more articles (e.g., article 102 of FIG. 1); and/or present a GUI to the user for enabling the user to initiate a detachment process for detaching a security tag (e.g., security tag 132 of FIG. 1) from an article (e.g., article 102 of FIG. 1).

The retail transaction process can generally involve: prompting a user of the MCD 104 to manually input article information or prompting the user of the MCD 104 to place the MCD in proximity to the article; obtaining the article information manually from the user or automatically from the article via SRC (e.g., barcode communication or NFC communication); prompting the user for payment information; obtaining payment information manually from the user of the MCD or automatically from a payment card via an electronic card reader or a barcode reader 380; and establishing a retail transaction session with an RTS (e.g., RTS 118 of FIG. 1).

The retail transaction session generally involves: communicating the article information and payment information to the RTS via public network connection; receiving a response message from the RTS indicating that the article has been successfully or unsuccessfully purchased; and automatically starting the detachment process or prompting the user to start the detachment process if the article has been successfully purchased.

The detachment process can generally involve: obtaining a unique identifier (e.g., unique identifier 210 of FIG. 2) from the article (e.g., article 102 of FIG. 1) and/or the security tag (e.g., security tag 132 of FIG. 1); forwarding the unique identifier(s) to the RTS; receiving a message from the RTS that includes information specifying a detachment key or a detachment code associated with the unique identifier; optionally deriving the detachment key from the detachment code; optionally generating instructions for programming the security tag to unlock an electronic lock mechanism using the detachment key on a one-time basis; and sending the detachment key and/or instructions to the security tag. In some scenarios, the MCD simply forwards the information received from the RTS to the security tag without modification. In other scenarios, the MCD modifies the information prior to communication to the security tag. Such modifications can be performed by a processor with a tamper-proof enclosure such that if a person tries to maliciously obtain access to any algorithm used for such modification purposes, the algorithm(s) will be erased prior to any access thereto. This configuration may be advantageous when cryptography is not employed for communications between the MCD and the RTS. Still, this configuration may be employed even when such cryptography is used.

Figure 4:
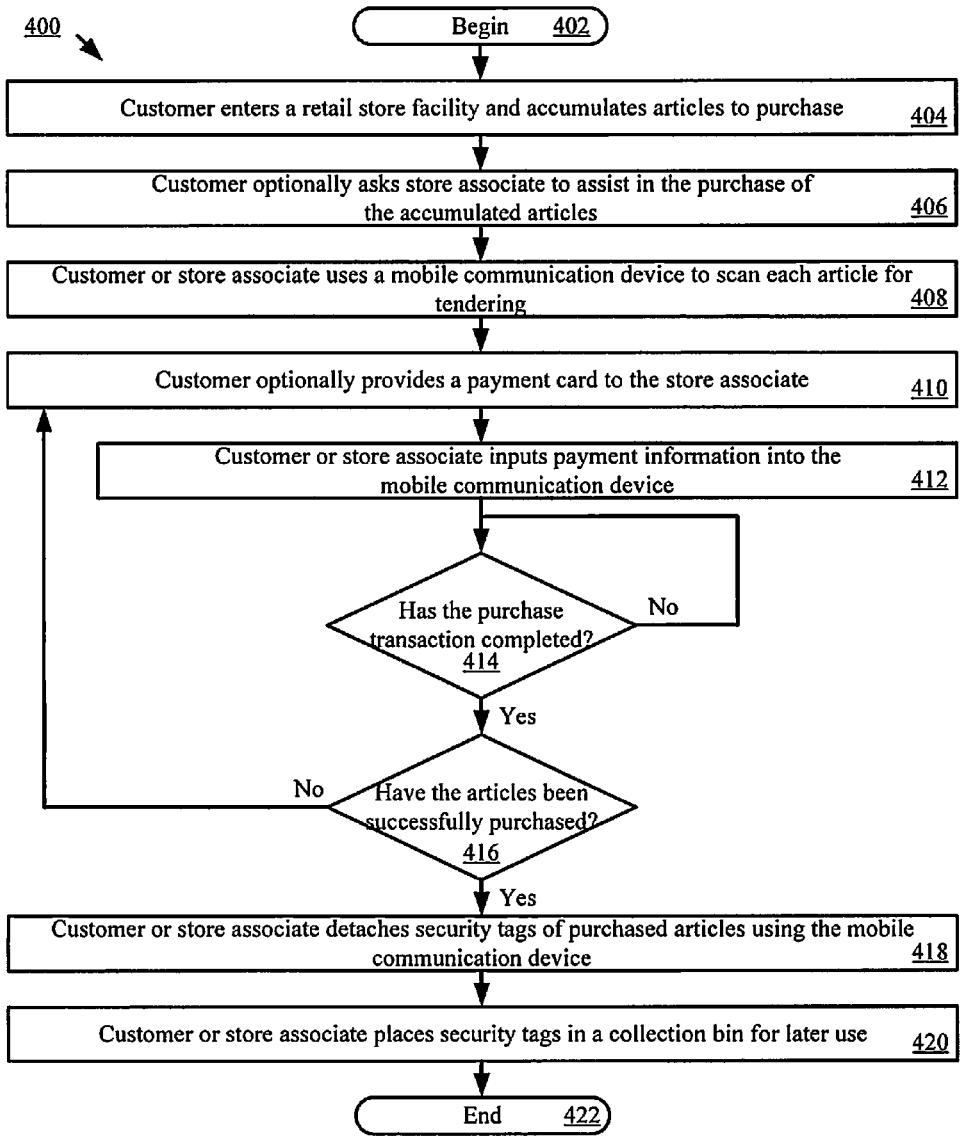
FIG. 4 is a flow diagram of an exemplary method for purchasing an article from a retail store facility that is useful for understanding the present invention.

Referring now to FIG. 4, there is provided a flow diagram of an exemplary method 400 for purchasing an article (e.g., article 102 of FIG. 1) from a retail store facility (e.g., retail store facility 150 of FIG. 1) that is useful for understanding the present invention. Method 400 begins with step 402 and continues with step 404 where a customer (e.g., customer 140 of FIG. 1) enters the retail store facility and accumulates one or more articles to purchase. In some scenarios, the customer may then ask a store associate (e.g., store associate 142 of FIG. 1) to assist in the purchase of the accumulated articles, as shown by optional step 406. Optional step 406 may be performed when the customer 140 does not have an MCD (e.g., MCD 104 of FIG. 1) with a retail transaction application, plug-in or add-on installed thereon. If the customer is in possession of such an MCD, then the customer would not need the assistance from a store associate for completing a purchase transaction and/or detaching security tags from the articles.

In a next step 408, the customer or store associate uses the MCD to scan each article for tendering. The scanning can be achieved using a barcode scanner, an RFID scanner, an NFC tag scanner, or any other SRC means. Once the articles have been scanned, payment information is input into the retail transaction application of the MCD, as shown by steps 410-412. The payment information can be input by the person in possession of the MCD, i.e., the customer or the store associate. The payment information can include, but is not limited to, a customer loyalty code, payment card information, and/or payment account information. The payment information can be input manually, via an electronic card reader (e.g., a magnetic strip card reader) or via a barcode reader. In the card/barcode scenarios, the customer may provide a payment card to the store associate, as shown by optional step 410.

After the payment information has been input into the retail transaction application, a decision step 414 is performed to determine if a purchase transaction has been completed. This determination is made by the MCD based on information received from an RTS, as described above. An exemplary purchase transaction process will be described below in relation to FIG. 5. If the purchase transaction is not completed [414:NO], then method 400 returns to step 414. If the purchase transaction is completed [414:YES], then a decision step 416 is performed. In step 416, it is determined whether the articles have been successfully purchased. If the articles have not been successfully purchased [416:NO], then method 400 returns to step 410. In contrast, if the articles have been successfully purchased [416:YES], then steps 418-422 are performed.

Step 418 involves detaching the security tags (e.g., security tag 132 of FIG. 1) from the articles. The security tags are detached by the customer or store associate using the MCD. An exemplary detachment process will be described below in relation to FIGS. 6A-6E. The detached security tag can then be placed in a collection bin for later use, as shown by step 420. Subsequently, step 422 is performed where method 400 ends.

Referring now to FIG. 5, there is provided an exemplary purchase transaction process 500 facilitated by an MCD (e.g., MCD 104 of FIG. 1). Process 500 begins with step 502 and continues with optional step 504. In optional step 504, the MCD receives authentication information (e.g., a user name, a password, or biometric information) from a user thereof. The authentication information is used for authenticating the user (e.g., customer 140 of FIG. 1 or store associate 142 of FIG. 1). Methods for authenticating users based on authentication information are well known in the art. Any known or to be known method for authenticating a user can be used herein without limitation.

After authenticating the user, step 506 is performed where the MCD launches a retail transaction application configured to facilitate the purchase of one or more articles (e.g., article 102 of FIG. 1) from a retail store facility (e.g., retail store facility 150 of FIG. 1). The retail transaction application can be a pre-installed application, add-on application, or a plug-in application. The retail transaction application can be downloaded to the MCD via a website or other electronic data transfer means prior to step 506. In some scenarios, the retail transaction application is launched in response to a user-software interaction. In other scenarios, the retail transaction application is launched automatically in response to user authentication.

Thereafter, the MCD receives a user input to start a retail transaction process for purchasing an article (e.g., article 102 of FIG. 1). In this regard, a GUI can be presented to the user of the MCD. The GUI may include a prompt for a user-software interaction for beginning a retail purchase process. Upon completing step 508, step 510 is performed where the MCD receives article information that is useful for purchasing the article. The article information can be input into the retail transaction software via a user-software interaction or an SRC. The SRC can include, but is not limited to, a barcode communication (e.g., barcode communication 122 of FIG. 1) or an NFC communication (e.g., NFC communication 120 of FIG. 1). The article information can include, but is not limited to, an article identifier, an article purchase price, and/or a security tag identifier.

Upon receiving the article information, step 512 is performed where payment information is input into the retail transaction application. The payment information can be input into the retail transaction software via a user-software interaction or an SRC (e.g., a barcode scan or a payment card scan). The payment information can include, but is not limited to, a customer loyalty code, payment card information, and/or payment account information.

In a next step 514, the MCD performs operations for establishing a retail transaction session with an RTS (e.g., RTS 118 of FIG. 1). Subsequently, step 516 is performed where the article information and payment information is communicated from the MCD to the RTS via a public network (e.g., public network 106 of FIG. 1). At the RTS, the article information and the payment information is processed, as shown by step 518. This information is processed by the RTS to complete a purchase transaction.

Once the purchase transaction is completed, step 520 is performed where a response message is generated by the RTS. The response message indicates whether the articles have been successfully or unsuccessfully purchased. The response message is then communicated in step 522 from the RTS to the MCD. Thereafter, a decision step 524 is performed where the MCD determines if the articles were successfully purchased. This determination can be made based on the contents of the response message. If the articles were not successfully purchased [524:NO], then step 526 is performed where the method 500 ends or other processing is performed. In contrast, if the articles were successfully purchased [524:YES], then steps 528-530 are performed. Step 528 involves starting a security tag detaching process automatically by the MCD, automatically by the RTS, or in response to a user-software interaction with the MCD. An exemplary security tag detachment process will be described below in relation to FIGS. 6A-6E. Subsequent to completing step 528, step 530 is performed where the method 500 ends or other processing is performed.

Referring now to FIGS. 6A-6E, there is provided an exemplary security tag detachment process 600 that is useful for understanding the present invention. Process 600 begins with step 602 and continues with step 604. Step 604 involves displaying a GUI to the user of the MCD (e.g., MCD 104 of FIG. 1). The GUI enables the user to start a process for removing a security tag (e.g., security tag 132 of FIG. 1) from an article (e.g., article 102 of FIG. 1). Once the process has been initialized, process 600 can involve performing optional steps 606-610. Optional steps 606-610 can be performed when the article information obtained from the article is absent of a security tag identifier. If the article information includes the security tag identifier, then method 600 may be absent of steps 606-610.

In optional step 606, a user (e.g., customer 140 of FIG. 1 or sales associate 142 of FIG. 1) places the MCD in proximity of a security tag (e.g., security tag 132 of FIG. 1). Consequently in optional step 608, the MCD obtains at least a unique identifier from the security tag via an SRC. An indication is provided to the user of the MCD indicating that the unique identifier has been successfully obtained from the security tag, as shown by optional step 610.

Subsequent to completing step 604 or optional step 610, step 612 is performed where the MCD obtains a telephone number, an electronic address (e.g., an Internet Protocol ("IP") address) of a computing device (e.g., computing device 108 of FIG. 1) of an RTS (e.g., RTS 118 of FIG. 1), and/or an electronic mail address of the user of the RTS computing device. The telephone number, electronic address and/or electronic mail address can be obtained from the user of the MCD or from a directory stored in a data store (e.g., memory 312 of FIG. 3) of the MCD.

The telephone number or the electronic address is then used in step 614 to establish a communication link between the MCD and RTS computing device. The communication link can include, but is not limited to, an RF communication link (e.g., RF communication link 124 of FIG. 1). In some scenarios, the MCD and/or the RTS computing device comprise a mobile phone employing smart technology. Such mobile phones are referred to in the art as Smartphones. Smartphones are well known in the art, and therefore will not be described herein.

Additionally or alternatively, step 614 can involve sending electronic mail to the user of the RTS computing device indicating that an access request has been made. In this scenario, the electronic mail may include, but is not limited to, a means for launching an application for granting/denying the access request, a unique identifier of the security tag, a unique identifier of the object/item being secured by the security tag, a unique identifier of the user of the MCD (e.g., a user name), and/or a unique identifier of the MCD (e.g., a telephone number).

Upon completing step 614, optional step 616 is performed. Optional step 616 can be performed if a communication link was established between the MCD and RTS computing device in step 614 via the telephone number or electronic address. Optional step 616 may not be performed where electronic mail is employed in step 614.

In optional step 616, a first message is communicated from the MCD to the RTS computing device. The first message may indicate that a user of the MCD is requesting detachment of a security tag from an article. In this regard, the message can include, but is not limited to, a unique identifier of the security tag, a unique identifier of the article being secured by the security tag, a unique identifier of the user of the MCD (e.g., a user name), and/or a unique identifier of the MCD (e.g., a telephone number). In some scenarios, the first message is a text message or a pre-recorded voice message.

Thereafter, the method 600 continues with step 618. Step 618 involves launching a pre-installed application, add-on application and/or a plug-in application of the RTS computing device. The application can be launched in response to receiving the first message from the MCD or the electronic mail message from the MCD. The pre-installed application, add-on application, and/or plug-in application can be automatically launched in response to the reception of the first message or electronic mail message. Alternatively, the pre-installed application, add-on application, and/or plug-in application can be launched in response to a user-software interaction. The pre-installed application, add-on application, and/or plug-in application is configured to facilitate control of access to the area and/or object. An audible indication may also optionally be emitted from the RTS computing device in response to the reception of the first message or electronic mail thereat, as shown by step 620.

Next, an optional decision step 622 is performed to determine if the security tag is allowed to be detached from the article. This determination can be made using the information contained in the received message (i.e., the first message or the electronic mail message) and/or information stored in a data store of the RTS. For example, it may be determined that the security tag is allowed to be detached from the article when (a) the article has been successfully purchased and/or (b) an identifier of the user and/or MCD match that stored in the data store of the RTS. Alternatively or additionally, such a determination can be made when a classification level assigned to the user is the same as that of the article being secured by the security tag. The classification level can include, but is not limited to, a retail floor personnel, a retail store manager, a retail store owner, a privileged customer, a secret level, a top secret level, a classified level, and/or an unclassified level.

Figure 6A:
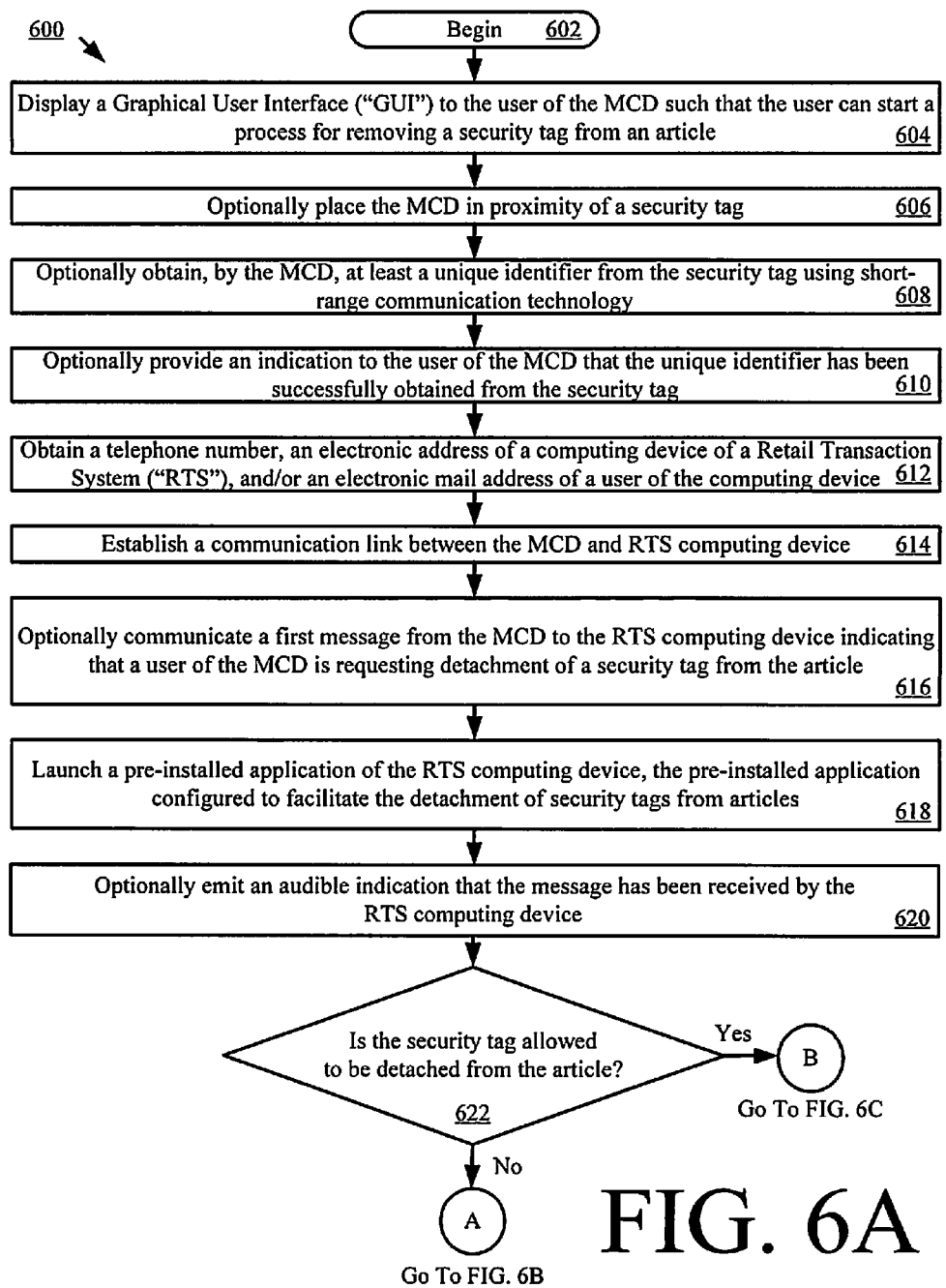
FIGS. 6A-6E collectively provide a flow diagram of an exemplary security tag detachment process that is useful for understanding the present invention.
Figure 6B:
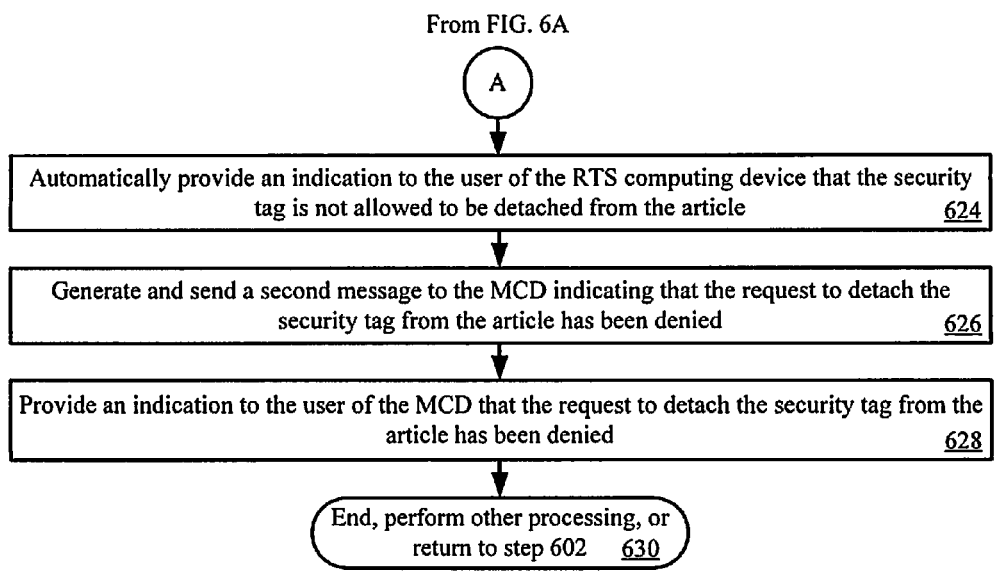

If it is determined that the security tag is not allowed to be removed from the article [622:NO], then the method 600 continues with steps 624-630 of FIG. 6B. Step 624 involves automatically providing an indication to the user of the RTS computing device that the security tag is not allowed to be detached from the article. Also, a second message is generated and sent to the MCD indicating that the user's request to detach the security tag from the article has been denied, as shown by step 626. Upon receipt of the second message at the MCD, an indication is provided to the user thereof that his/her request has been denied. Subsequently, step 630 is performed where the method 600 ends, other processing is performed, or the method 600 returns to step 602.

Figure 6C:
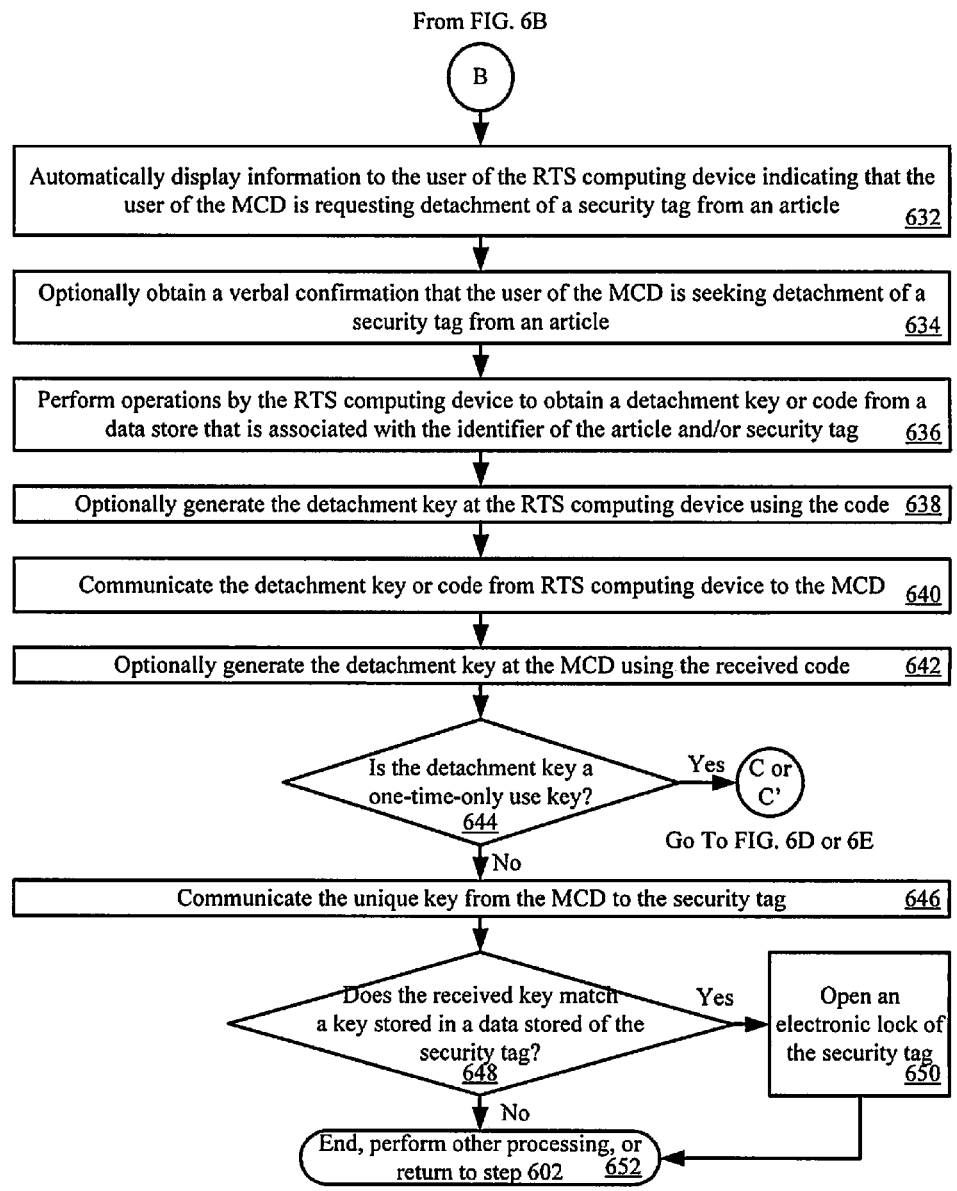

If it is determined that the user of the security tag is allowed to be detached from the article [622:YES], then the method 600 continues with step 632 of FIG. 6C. As shown in FIG. 6C, step 632 involves automatically displaying information to the user of the RTS computing device which indicates that the user of the MCD is requesting detachment of a security tag from an article. In this regard, the displayed information can include, but is not limited to, information identifying the user of the MCD, information identifying the MCD, contact information for the user and/or MCD, information identifying the article, information identifying the security tag, and/or information indicating that a security tag detachment is being requested. Thereafter, an optional step 634 is performed for obtaining a verbal confirmation from the user of the MCD that (s)he is seeking detachment of the security tag from the article.

In a next step 636, the RTS computing device performs operations to obtain a detachment key or code from a data store that is associated with the identifier of the article and/or the identifier of the security tag. If a detachment code is obtained in step 636, then an optional step 638 may be performed where the detachment key is generated by the RTS computing device. In a next step 640, the detachment key or code is communicated from the RTS computing device to the MCD. If the MCD receives the detachment code, then it may generate the detachment key using the detachment code, as shown by optional step 642.

Once the MCD possesses the detachment key, a decision is made in optional step 644 to determine if the detachment key is a one-time-only use key. If it is determined that the detachment key is not a one-time-only use key [644:NO], then steps 646-652 are performed. Step 646 involves communicating the detachment key from the MCD to the security tag. At the security tag, a decision is made as to whether the received detachment key matches a detachment key (e.g., detachment key 212 of FIG. 2) stored in a data store (e.g., memory 208 of FIG. 2) thereof. If the received detachment key matches the stored detachment key [648:YES], then the electronic lock of the security tag is opened using the detachment key, as shown by step 650. Step 650 can alternatively or additionally involve releasing and/or removing a tack, pin or lanyard of an electro-mechanical lock mechanism (e.g., electro-mechanical lock mechanism 216 of FIG. 2). Thereafter, step 652 is performed where the method 600 ends, other processing is performed, or the method 600 returns to step 602.

Figure 6D:
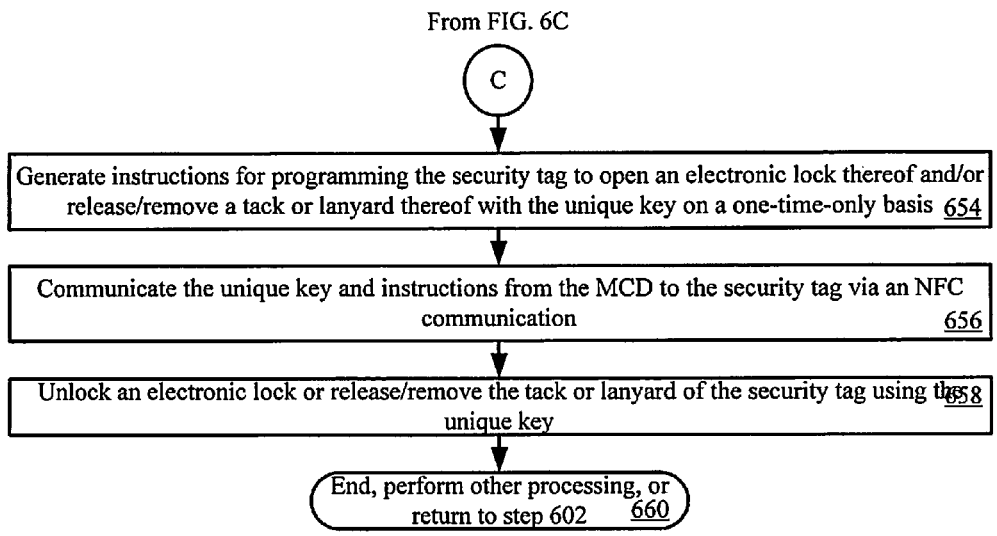
Figure 6E:
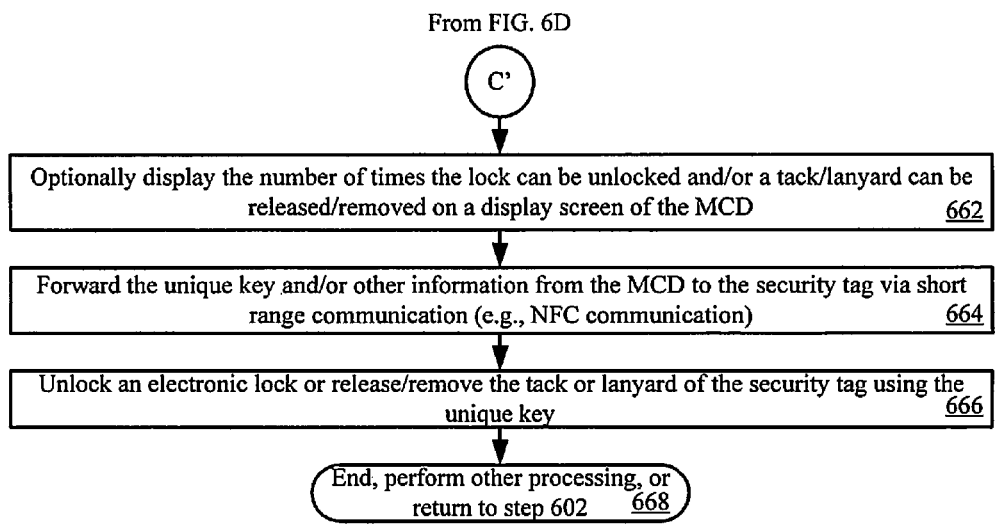

If it is determined that the detachment key is a one-time-only use key [644:YES], then the method 600 continues with steps 654-660 of FIG. 6D or steps 662-668 of FIG. 6E, depending on the particular application. As shown in FIG. 6D, step 654 involves generating instructions for programming the security tag to open an electronic lock and/or release/remove a tack/pin/lanyard thereof with the detachment key on a one-time-only basis. The detachment key and the instructions are then sent in step 656 from the MCD to the security tag via an SRC (e.g., an NFC communication). Upon receipt of the detachment key and instructions, the security tag unlocks the electronic lock thereof and/or releases/removes the tack/pin/lanyard thereof, as shown by step 658. Subsequently, step 660 is performed where the method 600 ends, other processing is performed, or the method 600 returns to step 602.

As shown in FIG. 6E, step 662 involves optionally displaying the number of times the lock can be unlocked and/or a tack/pin/lanyard can be released/removed using the detachment key on a display screen of the MCD. In a next step 664, the MCD simply forwards the information received from RTS to security tag without modification. The information can include, but is not limited to, a detachment key/code for unlocking a lock or releasing/removing a tack/pin/lanyard, time out information, and/or information specifying the number of times the detachment key/code can be used. The information can be sent in one or more transmissions from the MCD to the security tag. At the security tag, the detachment key/code will be extracted from the information and used to cause the lock to be unlocked and/or the tack/pin/lanyard to be released/removed, as shown by step 666. Subsequently, step 668 is performed where the method 600 ends, other processing is performed, or the method 600 returns to step 602.

As noted above, the security tag can be placed in a collection bin once it has been detached from the article. Thereafter, the security tag can be attached to another article. In this regard, the electronic lock of the security tag can be locked in response to the reception of a locking code from an external device (e.g., MCD 104 of FIG. 1 or RTS 118 of FIG. 1). Also, the security tag can send a response message to the external device indicating that the electronic lock has been once again locked. This locking process can be triggered by another read of the unique identifier (e.g., unique identifier 210 of FIG. 2) stored in the security tag. Alternatively or additionally, the electronic lock, tack, pin and/or lanyard can be secured automatically when the time expires as specified by the time limit information received from the external device. Also, a timeout mechanism of the security tag can start after pre-determined time period programmed in the security tag has expired.

Figure 7:
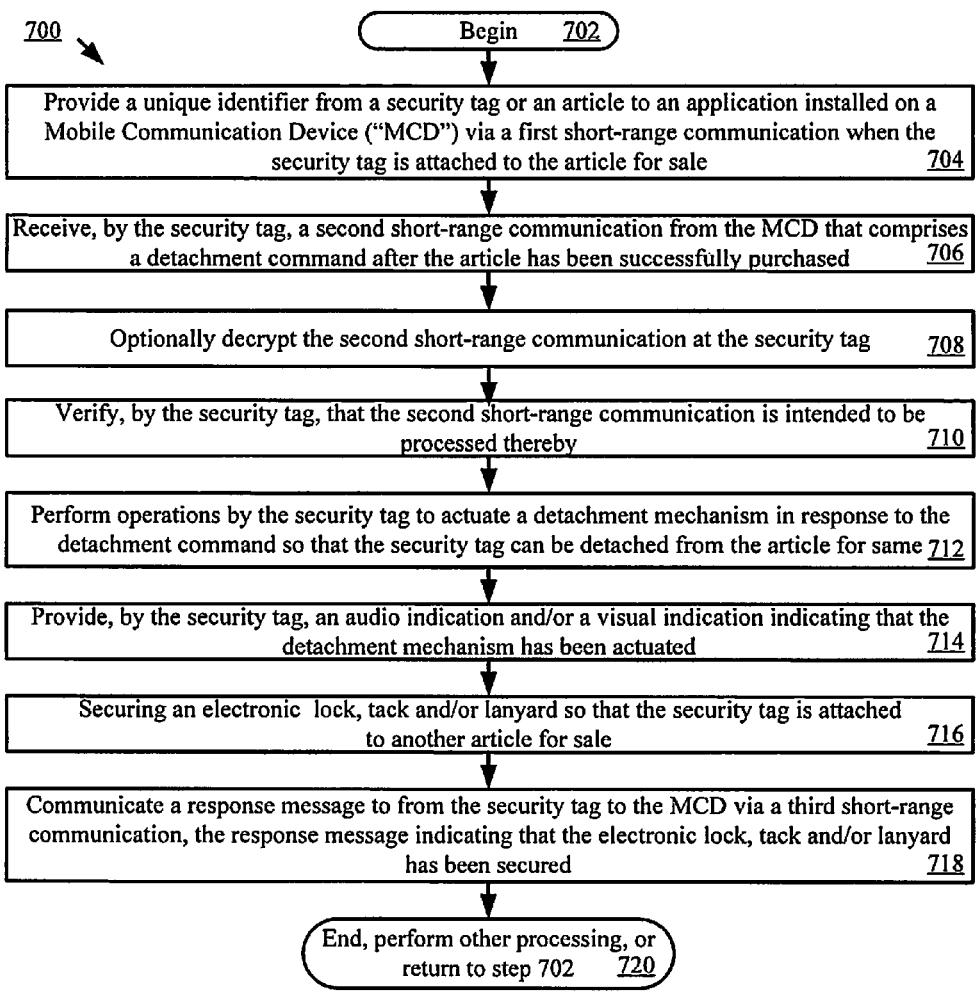
FIG. 7 is a flow diagram of an exemplary method for operating a security tag of an EAS system.

Referring now to FIG. 7, there is provided a flow diagram of an exemplary method 700 method for operating a security tag (e.g., security tag 132 of FIG. 1) of an EAS system (e.g., EAS system 130 of FIG. 1) that is useful for understanding the present invention. As shown in FIG. 7, method 700 begins with step 702 and continues with step 704. Step 704 involves providing a unique identifier from the security tag to an application installed on an MCD (e.g., MCD 104 of FIG. 1) via a first short-range communication (e.g., NFC 120 or barcode communication 122 of FIG. 1) when the security tag is attached to an article for sale (e.g., article 102 of FIG. 1). Alternatively or additionally, step 704 can involve communicating the unique identifier and/or another identifier from the article to the MCD (e.g., a mobile phone). The first short-range communication can include, but is not limited to, a barcode communication or an NFC.

Thereafter in step 706, the security tag receives a second short-range communication from the MCD that comprises a detachment command exclusively after the article has been successfully purchased. In some scenarios, the detachment command also includes a one-time-only detachment key and/or instructions for programming the security tag to actuate the detachment mechanism using the one-time-only detachment key. The security tag may then optionally decrypt the second short-range communication, as shown by step 708.

Upon completing step 706 or optional step 708, step 710 is performed where the security tag verifies that the second short-range communication is intended to be processed thereby. This verification can be achieved by: parsing an identifier or address from the second short-range communication; and comparing the parsed identifier/address to a stored identifier/address to determine is a match exists therebetween. If a match exists, then it is verified that the second short-range communication is intended for the security tag.

Once the verification process is completed, the security tag performs operations to actuate a detachment mechanism in response to the detachment command so that the security tag can be detached from the article for sale, as shown by step 712. An audio indication and/or a visual indication may be output from the security tag in step 714 indicating that the detachment mechanism has been actuated.

As noted above, the security tag can be placed in a bin once it has been detached from the article. Thereafter, the security tag can be attached to another article. In this regard, the method 700 can continue with steps 716-720. Step 716 involves securing an electronic lock, tack, pin and/or lanyard so that the security tag is attached to another article for sale. In some scenarios, the securement is achieved by: locking the electronic lock in response to a locking code received from the MCD; and/or automatically securing the security tag to the article when a pre-defined time period expires. The pre-defined time period can be specified by time limit information received by the security tag from the MCD. Step 718 involves communicating a response message from the security tag to the MCD via a third short-range communication. The response message indicates that the electronic lock, tack, pin and/or lanyard has been secured. Subsequently, step 720 is performed where the method 700 ends, other processing is performed, or the method 700 returns to step 702.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for operating a security tag of an Electronic Article Surveillance ("EAS") system, comprising:
   providing a unique identifier from the security tag to an application installed on a mobile communication device via a first short-range communication when the security tag is attached to an article for sale;
   receiving, by the security tag, a second short-range communication from the mobile communication device that comprises a detachment command exclusively after the article has been successfully purchased;
   verifying, by the security tag, that the second short-range communication is intended to be processed thereby; and
   performing operations by the security tag to actuate a detachment mechanism in response to the detachment command so that the security tag can be detached from the article for sale.

2. The method according to claim 1, wherein the mobile communication device is a mobile phone.

3. The method according to claim 1, wherein the first short-range communication is a barcode communication or a near field communication.

4. The method according to claim 1, further comprising decrypting the second short-range communication at the security tag prior to performing said verifying step.

5. The method according to claim 1, further comprising providing by the security tag an audio indication or a visual indication indicating that the detachment mechanism has been actuated.

6. The method according to claim 1, wherein the detachment command comprises instructions for programming the security tag to actuate the detachment mechanism using a one-time-only detachment key.

7. The method according to claim 1, further comprising receiving a locking code from the mobile communication device for locking an electronic lock of the security tag.

8. The method according to claim 7, further comprising communicating a response message from the security tag to the mobile communication device via a third short-range communication, the response message indicating that the electronic lock has been once again locked.

9. The method according to claim 1, further comprising automatically securing the security tag to the article when a pre-defined time period expires.

10. The method according to claim 9, wherein the pre-defined time period is specified by time limit information received by the security tag from the mobile communication device.

11. A security tag of an Electronic Article Surveillance ("EAS") system, comprising:
    at least one electronic circuit configured to:
       provide a unique identifier to an application installed on a mobile communication device via a first short-range communication when the security tag is attached to an article for sale;
       receive a second short-range communication from the mobile communication device that comprises a detachment command exclusively after the article has been successfully purchased;
       verify that the second short-range communication is intended to be processed by the security tag; and
       actuate a detachment mechanism in response to the detachment command so that the security tag can be detached from the article for sale.

12. The security tag according to claim 11, wherein the mobile communication device is a mobile phone.

13. The security tag according to claim 11, wherein the first short-range communication is a barcode communication or a near field communication.

14. The security tag according to claim 11, wherein the electronic circuit is further configured to decrypt the second short-range communication prior to verifying that the second short-range communication is intended to be processed by the security tag.

15. The security tag according to claim 11, wherein the electronic circuit is further configured to output an audio indication or a visual indication indicating that the detachment mechanism has been actuated.

16. The security tag according to claim 11, wherein detachment command comprises instructions for programming the security tag to actuate the detachment mechanism using a one-time-only detachment key.

17. The security tag according to claim 11, wherein the electronic circuit is further configured to receive a locking code from the mobile communication device for locking an electronic lock of the security tag.

18. The security tag according to claim 17, wherein the electronic circuit is further configured to communicate a response message to the mobile communication device via a third short-range communication, the response message indicating that the electronic lock has been once again locked.

19. The security tag according to claim 11, wherein the electronic circuit is further configured to automatically secure the security tag to the article when a pre-defined time period expires.

20. The security tag according to claim 19, wherein the pre-defined time period is specified by time limit information received by the security tag from the mobile communication device.

* * * * *